US008843175B2

(12) United States Patent
Nukala et al.

(10) Patent No.: US 8,843,175 B2
(45) Date of Patent: Sep. 23, 2014

(54) APPARATUS AND METHODS FOR MITIGATING PROTOCOL-INDUCED BACK-OFFS IN A COMMUNICATION NETWORK

(75) Inventors: Gaurav Nukala, Cupertino, CA (US); Giri Prassad Deivasigamani, Cupertino, CA (US); Muhammad A. Alam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 13/535,194

(22) Filed: Jun. 27, 2012

(65) Prior Publication Data

US 2013/0244590 A1 Sep. 19, 2013

Related U.S. Application Data

(60) Provisional application No. 61/612,910, filed on Mar. 19, 2012.

(51) Int. Cl.
*H04M 1/00* (2006.01)
(52) U.S. Cl.
USPC ........................................ 455/552.1; 455/515
(58) Field of Classification Search
USPC .......... 370/328, 329, 341, 342, 345; 455/450, 455/509, 464, 434, 552.1, 515
See application file for complete search history.

(56) References Cited

U.S. PATENT DOCUMENTS

| 6,903,684 | B1 * | 6/2005 | Simic et al. ............... 342/357.29 |
|---|---|---|---|
| 8,570,951 | B1 * | 10/2013 | Rajurkar et al. ............... 370/328 |
| 2005/0245253 | A1 | 11/2005 | Khushu et al. |
| 2008/0310357 | A1 * | 12/2008 | Ulupinar et al. ............... 370/329 |
| 2013/0267267 | A1 * | 10/2013 | Mujtaba et al. ............... 455/509 |
| 2013/0310057 | A1 * | 11/2013 | Tabet et al. ............... 455/450 |
| 2013/0315153 | A1 * | 11/2013 | Sebeni et al. ............... 370/329 |

FOREIGN PATENT DOCUMENTS

| WO | 2008140222 | 11/2008 |
|---|---|---|
| WO | 2009058086 | 5/2009 |
| WO | 2010087617 | 8/2010 |

OTHER PUBLICATIONS

"A Scheme for Adapting TCP to Drastic Changes in Link Characteristics", Ishibashi et al.,International Conference on Mobile Ubiquitous Computing, Systems, Services and Technologies, IEEE Computer Society, Nov. 1, 2007, DOI 10.1109/UBICOMM.2007.21, pp. 183-188.
"Freeze-TCP: A true end-to-end TCP enhancement mechanism for mobile environments", Goff et al., IEEE INFOCOM 2000, Mar. 26, 2000, 0-7803-5880-5/00, pp. 1537-1545.
International Search Report and Written Opinion for PCT Application No. PCT/US2013/033017, mailed Sep. 5, 2013.

* cited by examiner

*Primary Examiner* — Sonny Trinh
(74) *Attorney, Agent, or Firm* — Womble Carlyle Sandridge & Rice LLP

(57) ABSTRACT

Methods and apparatus for mitigating data server time-outs in e.g., a hybrid wireless network. In one exemplary embodiment, a client device operating in a hybrid network environment utilizes its knowledge about tune-away periods so as to minimally affect data network operation. For example, during periods of data downlink activity, the client device induces some delay in the acknowledgement packets sent back towards the network prior to entering into a tune away period. These delayed acknowledgement packets result in an increased retransmission time out period value thereby reducing the probability of encountering a data server time-out. Alternative embodiments are also discussed which preoccupy the network apparatus during these tune away periods so as to also mitigate time-outs during these periods. These mitigation algorithms are useful in both downlink and uplink data transmissions. Apparatus for implementing these methodologies are also disclosed.

16 Claims, 12 Drawing Sheets

APPARATUS AND METHODS FOR MITIGATING PROTOCOL-INDUCED BACK-OFFS IN A COMMUNICATION NETWORK

PRIORITY AND RELATED APPLICATIONS

This application claims priority to co-owned and U.S. Provisional Patent Application Ser. No. 61/612,910 filed Mar. 19, 2012 and entitled "APPARATUS AND METHODS FOR MITIGATING PROTOCOL-INDUCED BACK-OFFS IN A COMMUNICATION NETWORK", which is incorporated herein by reference in its entirety.

This application is related to co-owned and U.S. Provisional Patent Application Ser. No. 61/478,922 filed Apr. 25, 2011, and entitled "DUAL NETWORK MOBILE DEVICE RADIO RESOURCE MANAGEMENT," U.S. patent application Ser. No. 13/099,204, filed May 21, 2011, and entitled "SINGLE-RADIO DEVICE SUPPORTING COEXISTENCE BETWEEN MULTIPLE RADIO ACCESS TECHNOLOGIES," U.S. Provisional Patent Application Ser. No. 61/472,617 filed Apr. 6, 2011, and entitled "MULTIPLE NETWORK MOBILE DEVICE CONNECTION MANAGEMENT," U.S. Provisional Patent Application Ser. No. 61/433,160 filed Jan. 14, 2011, and entitled "DYNAMIC LOADING IN DEVICES WITH MULTIPLE ANTENNAS," and U.S. Provisional Patent Application Ser. No. 61/433,162 filed Jan. 14, 2011, and entitled "MULTIMODE USER EQUIPMENT WITH DUAL CIRCUIT ARCHITECTURE," each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to operation within communications networks such as, for example, hybrid network operation in which client devices can communicate using any one or more of several heterogeneous radio access technologies. More particularly, in one exemplary aspect, the present invention is directed to methods and apparatus for mitigating data transmission time-outs resultant from hybrid network operation.

2. Description of Related Technology

A cellular network operator provides mobile telecommunications services to the public via a network infrastructure of e.g., cellular base stations (BS), base station controllers, infrastructure nodes, etc. There are a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more cellular networks. Multimode operation allows a device to operate on any one of several network technologies, but does not enable operation on multiple network technologies simultaneously.

Incipient research is directed to so-called "hybrid" network operation. During hybrid network operation, the client device operates simultaneously among multiple distinct networks having different technologies. In one exemplary case, a hybrid device can support both: (i) Long Term Evolution (LTE) and (ii) Code Division Multiple Access 1X (CDMA 1X) networks; i.e., the device can maintain a simultaneous connection between a first LTE network and a second CDMA 1X network. For example, a LTE/CDMA 1X hybrid mobile device can conduct a voice call over the CDMA 1X network while the mobile device is in LTE mode. In another exemplary case, a hybrid device can support both: (i) CDMA 1X-EVDO (Evolution Data Optimized) and (ii) CDMA 1X networks.

Existing solutions for hybrid network operation rely on the client device to manage its own operation between networks. Specifically, the client device is responsible for maintaining its active connections to the various service networks; there are no required changes to existing network installations (i.e., hybrid network operation does not affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid operation are also capable of normal operation.

However, since existing solutions for hybrid network operation do not require the constituent networks to coordinate with one another, extant network equipment operation with client devices is less than optimal given the new demands placed on these client devices. For example, while a mobile device is attached to a first LTE network, it must periodically "tune out" the LTE network to perform CDMA 1X actions (such as decoding the Quick Paging Channel (QPCH) to determine if the device is being paged). If the mobile device is receiving data from a Transmission Control Protocol (TCP) server via the LTE network during the tune-out period, the TCP server will be unaware that the mobile device is tuned out, and will time-out its data transmission when it doesn't receive Acknowledgement Packets (ACKs) for the data that it had previously sent. Furthermore, TCP servers that back-off their data transmission drastically reduce the perceived throughput for the client device.

Consequently, improved methods and apparatus are needed for mitigating TCP level back-offs during these tune-out periods or other interruptions.

SUMMARY OF THE INVENTION

The present invention satisfies the aforementioned needs by providing, inter alia, improved apparatus and methods for mitigating data server back-offs during data transmissions that occur during a tune out or similar period.

In one aspect of the present invention, a method for mitigating data server back-offs in a hybrid network is disclosed. In one embodiment, a client device executes a mitigation algorithm that alters the behavior of a data server during client device-induced measurement gap periods. One implementation alters the data server behavior by delaying packet acknowledgement transmission from the client so as to in effect "buy more time" before the data server times out.

Another implementation triggers a false "network trouble" status so as to cause the data server to institute one or more remediation efforts, again buying the UE more time before the server times out.

In a second aspect of the invention, an apparatus for mitigating data server back-offs in a hybrid network is disclosed. In one variant, the apparatus is a network-side server (e.g., TCP-enabled data server).

In a third aspect of the invention, a computer-readable storage apparatus is disclosed.

In a fourth aspect of the invention, a hybrid network system is disclosed.

In a fifth aspect of the invention, a client device capable of hybrid network operation and capable of executing a mitigations algorithm for mitigating data server back-offs is disclosed.

In a sixth aspect of the invention, a method for generating increased timeout allocation from a network transport server is disclosed. In one embodiment, the method includes creating a false or dummy indication of a network problem or failure condition, thereby invoking remediation measures by the server (and hence a greater timeout interval). In another embodiment, the UE triggers an (unnecessary) retransmission event, again effectively extending the server timeout interval). In another aspect of the invention, mobile wireless apparatus is disclosed. In one embodiment, the apparatus includes a first air interface configured to communicate with a first wireless network; and logic in data communication with the first air interface. In one variant, the logic is configured to determine when the first air interface is to be tuned away from, and implement a function which at least reduces the chance that a network-side server utilizing the first air interface to transfer data to the mobile device will adversely alter its operation regarding delivery of the data.

In another embodiment, the logic is configured to determine when the first air interface is to be tuned away from for a period of time, and cause transmission of a message or signal to a network-side server utilizing the first air interface to transfer data to the mobile apparatus to cause the server to implement a function which at least reduces the chance that the server will adversely alter its operation regarding delivery of the data at least during the tune away period.

In a further aspect of the invention, a method for reducing the likelihood of encountering a data server time-out during transmission of data to a client device is disclosed. In one embodiment, the method includes: executing a data access technology; determining when the client device is to enter into a tune away period; and prior to entering the tune away period, executing a mitigation algorithm on the client device so as to reduce the likelihood of encountering a data server time-out.

In yet another aspect of the invention, a method of operating a data server during transmission of data to a client device is disclosed. In one embodiment, the method includes delivering data from the server to the client device via a wireless data access technology, and determining when the client device is to tune away from the data access technology. Prior to the tune away, a mitigation function is executed on the data server so as to reduce the likelihood of an interruption in the delivery of the data by the server.

Other features and advantages of the present invention will immediately be recognized by persons of ordinary skill in the art with reference to the attached drawings and detailed description of exemplary embodiments as given below.

Figure 1:
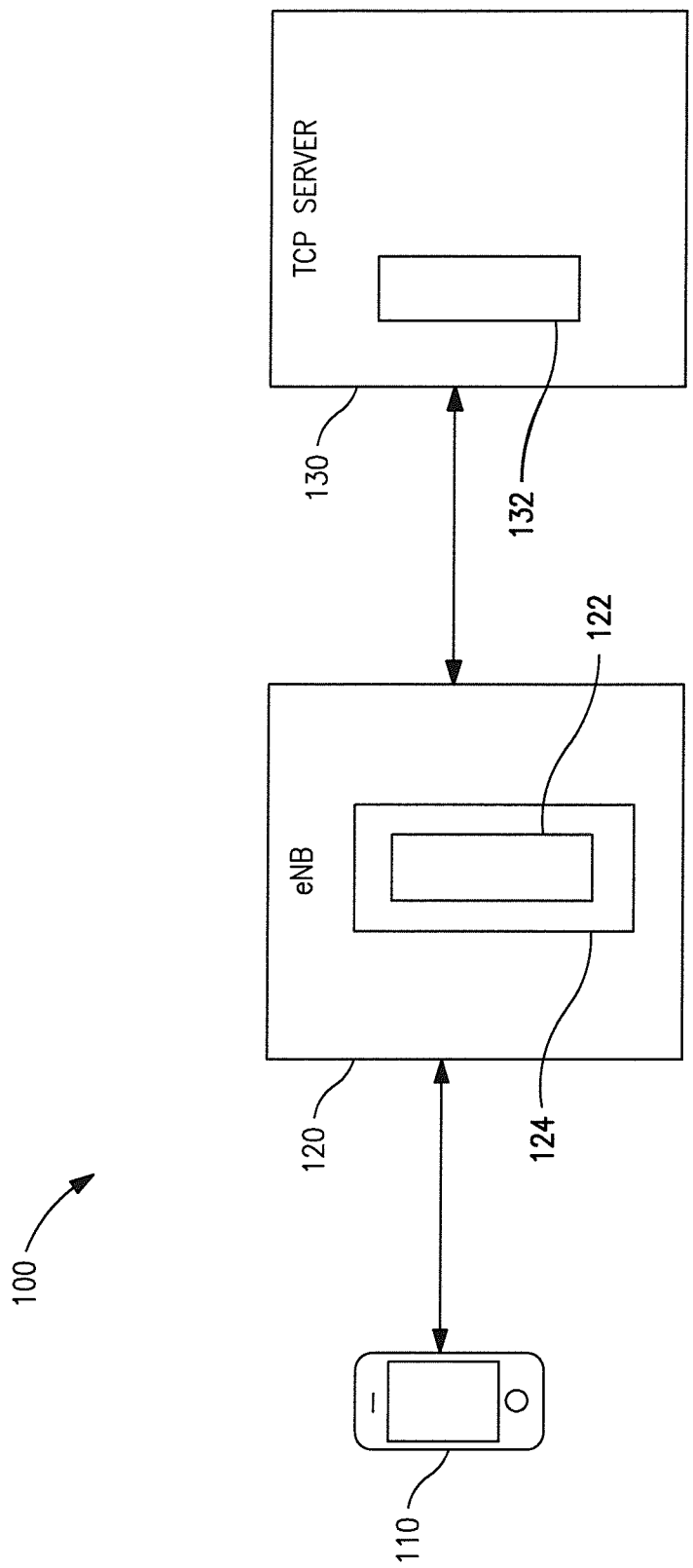
FIG. 1 is a logical block diagram illustrating one exemplary hybrid network system useful in conjunction with the present invention.

All Figures© Copyright 2012 Apple Inc. All rights reserved.

DETAILED DESCRIPTION OF THE INVENTION

Reference is now made to the drawings, wherein like numerals refer to like parts throughout.

Overview

Various aspects of the present invention provide, inter alia, a method for a client device to mitigate data server time-outs in a hybrid network. In one exemplary embodiment, a hybrid UE operating in CDMA 1X and LTE networks utilizes its knowledge about UE-induced measurement gap periods so as to minimally affect LTE network operation.

As previously noted, once the UE has connected to the LTE network, the UE will periodically tune its radio away from the LTE network to perform CDMA 1X maintenance actions such as acquiring a CDMA 1X cell, registering to the acquired CDMA 1X cell, and receiving CDMA 1X pages, etc. During periods of UE tune-away from the LTE network, LTE data transmission will go offline and if the TCP server fails to receive ACKs for the outstanding data that it has sent out to the UE, the TCP server will time-out its data transmission.

Hence, in order to mitigate this undesirable (TCP) server behavior, the inventive UE disclosed herein will execute one or more mitigation algorithms prior to entering into a tune-away period. For example, during periods of TCP downlink activity, the UE application processor will in one implementation induce some delay in the TCP ACKs (sent back towards the network in response to received data packets) prior to entering into the tune-away period. These delayed TCP ACKs result in an increased retransmission time out period value, thereby reducing the probability of encountering a TCP timeout.

Alternatively, and during periods of TCP uplink data transmissions, prior to entering an LTE suspend mode, the UE will, in an exemplary embodiment, lower its buffer fill limit in order to increase the retransmission timeout on the TCP server, such that the likelihood that TCP server time-outs occurring during data transmission is significantly reduced.

In alternate implementations, a network entity (such as the TCP server or designated proxy) is aware of the hybrid configuration/status of the UE, such as by way of a priori knowledge of configuration or by way of an uplink communication, and the server or entity can then apply modified timeout rules for that UE (e.g., at least when it is known to be operating in hybrid mode).

Various other embodiments of the present invention are described in greater detail hereinafter.

DETAILED DESCRIPTION OF EXEMPLARY EMBODIMENTS

Exemplary embodiments and aspects of the present invention are now described in detail. While these embodiments and aspects are primarily discussed in the context of Long Term Evolution (LTE) or LTE-A (LTE Advanced), Code Division Multiple Access 1X (CDMA 1X) cellular networks, and CDMA 1X EVDO (Evolution Data Optimized), it will be recognized by those of ordinary skill that the present invention is not so limited and can be used with other cellular technologies such as TD-LTE (Time-Division Long-Term Evolution), TD-LTE-Advanced, TD-SCDMA (Time Division Synchronous Code Division Multiple Access), and Global System for Mobile Communications (GSM). In fact, the various aspects of the invention are useful in combination with any network (cellular, wireless, wireline, or otherwise) that can benefit from the mitigation of data transmission time-outs as a result of interruptions introduced by e.g., hybrid network operation or other events.

Moreover, it will be appreciated that while exemplary embodiments of the apparatus and methods of the invention are described for purposes of illustration in terms of mobile devices that incorporate distinct application and baseband processors within their mobile device architecture, the present invention is not so limited, and can be utilized in mobile device architectures that incorporate application and baseband processor functionality into a unitary processor architecture. In fact, the various aspects of the invention can be implemented into virtually any mobile device architecture that can benefit from the mitigation of data transmission time-outs as a result of interruptions such as those due to hybrid network operation.

LTE/CDMA 1X Hybrid Network Operation

FIG. 1 illustrates an exemplary hybrid network system 100. The hybrid network comprises a first LTE RAN (radio access network) consisting of an Evolved Node B (eNB) 120 and a second CDMA 1X RAN (not shown) in communication with a user equipment (UE) client device 110. The LTE RAN and CDMA 1X RAN are unsynchronized and are entirely unaware of the other RAN's operation.

In other scenarios, the RANs may have higher levels of coordination; e.g., the RANs may be loosely synchronized, or even tightly synchronized in certain aspects of their operation. For example, in one such implementation, synchronization between the networks can be employed to selectively alter the behavior of the TCP server (or proxy entity), and/or the UE, such as where the CDMA network (or the UE) signals the LTE network (and TCP server either directly or indirectly via the LTE network) as to the UE's simultaneous hybrid operation in CDMA and LTE, such that the timeout interval or other parameter(s) can be dynamically adjusted to avoid timeouts on the TCP server.

During LTE/CDMA 1X (unsynchronized) hybrid mode operation, the UE 110 can place CDMA 1X voice calls while registered with the LTE network. The UE is capable of receiving and responding to data and control messaging from either the LTE network or the CDMA 1X network; unfortunately, the UE in this scenario cannot respond simultaneously to both networks. In one such embodiment, the UE always prioritizes CDMA 1X (voice call) traffic over LTE (data) traffic to ensure that user experience for voice calls is unaffected. Other implementations may have other prioritization schemes (e.g., where voice calls are lower priority, based on the type of traffic, historic device usage, etc.).

Within this context, many operations can be greatly affected by the UE switching. For example, as described in co-owned and co-pending U.S. Provisional Patent Application Ser. No. 61/488,649 filed on May 20, 2011, and entitled "APPARATUS AND METHODS FOR CLIENT SERVER INTERACTION IN HYBRID NETWORK ENVIRONMENTS", incorporated herein by reference in its entirety, maintenance tasks that are interrupted can introduce data corruptions and/or errors which can contribute to highly undesirable behavior (e.g., networks being barred, devices being improperly managed, etc.). While the foregoing disclosure provides methods and apparatus for modifying network management for hybrid operation, further improvements to client device operation so as to alleviate data server time-outs during tune away periods is useful, and can be used in complementary fashion to the improvements described therein.

In particular, once the UE has connected to the LTE network, the UE will periodically tune its radio away from the LTE network to perform CDMA 1X maintenance actions such as acquiring a CDMA 1X cell, registering to the acquired CDMA 1X cell, and receiving CDMA 1X pages, etc. Depending on CDMA 1X network radio conditions, these actions can range in one exemplary implementation from eighty milliseconds (80 ms) up to several seconds (4 s-6 s). Moreover, when the UE receives or places a voice call on the CDMA 1X network, the LTE connection may be dropped.

Data traveling over high-speed LTE networks can originate from the TCP transport layer 132 of network entities such as TCP server 130, and can reach transmission rates of, for instance, 73 Mbps on Release 8 (Rel8) LTE networks. Prior to transmission via the eNB 120, the TCP transport layer packets 122 are wrapped within a Packet Data Convergence Protocol (PDCP) sub-layer 124. The PDCP sub-layer exists in both the UE and eNB, and is part of the LTE air interface control and user planes. During periods of UE tune-away from the LTE network, LTE data transmission will go offline, and the TCP server will be agnostic to this UE behavior. Accordingly, the TCP server will continue to send data until it fills up the receiver buffer (e.g., per the negotiated receiver window size published by the UE). If the TCP fails to receive ACKs for the outstanding data that it has sent out to the UE, the TCP server will time-out its data transmission. The TCP server will back-off, resulting in a slow-start, which drastically reduces the throughput perceived by the UE (and hence the user). This may also lead to perceived "jerkiness"; e.g., the throughput rate changing markedly as a function of time, thereby potentially increasing user frustration (as compared to a more even throughput).

Methods—

Figure 2:
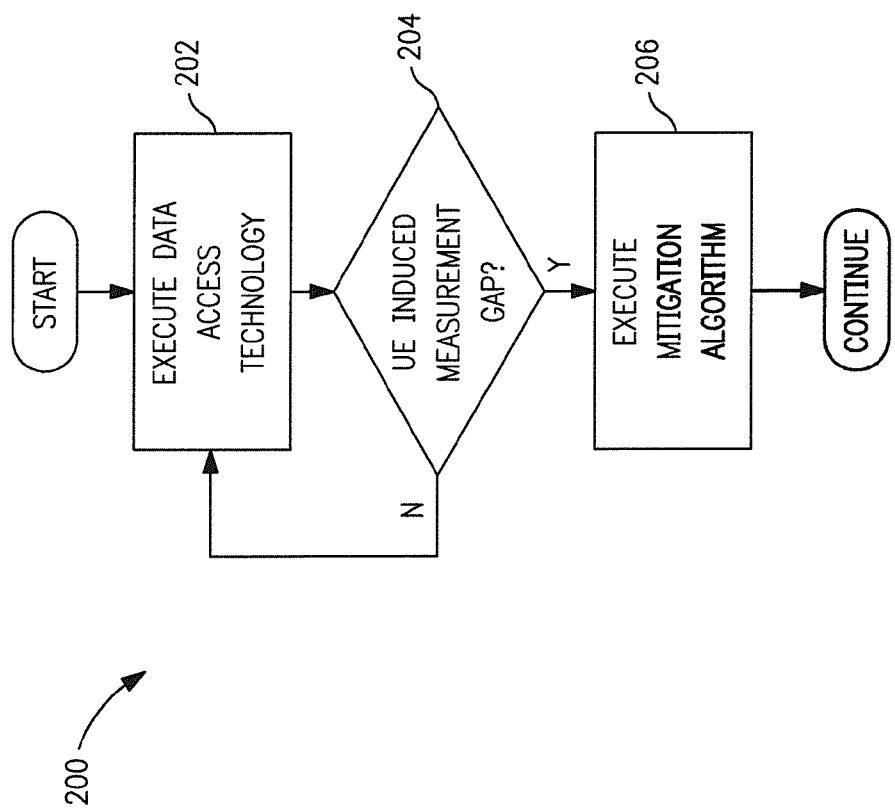
FIG. 2 is a functional block diagram of an exemplary embodiment of a portion of user equipment (UE) apparatus configured according to the present invention.

Referring now to FIG. 2, exemplary methodology 200 for mitigating data server time-outs is shown and described in detail. At step 202 of the method 200, a UE executes a data access technology. In one exemplary embodiment, the data access technology consists of an LTE data transmission over a cellular network. The LTE data transmission can be either a downlink data transmission or an uplink data transmission, and involves communication with a data server resident on an Internet Protocol (IP) network. In an exemplary implementation, the data server operates according to the TCP protocol, and hence constitutes a TCP server, although it will be appreciated that the present invention may be readily implemented using other protocols (transport and otherwise), such as e.g., the Stream Control Transport Protocol (SCTP).

The data transmitted between the TCP server and the UE can literally constitute any type of data transfer of interest to the UE or user thereof and can include, without limitation, web content (text, graphics, Uniform Resource Locator (URL) data and scripts), downloadable/up-loadable content (media files, software, documents), applications, live streaming media, social network content, etc.

At step 204 of the method 200, the UE determines whether it needs to execute a UE-induced measurement gap. In one embodiment, the UE-induced measurement gap results in the UE device tuning away from the data access technology network in order to execute necessary networks on an alternative network access technology. For example, the UE, when entering a UE induced measurement gap period, performs one or more CDMA 1X actions such as acquiring a CDMA 1X cell, registering to the acquired CDMA 1X cell, checking for location updates, inter-frequency measurements and/or decoding the Quick Paging Channel (QPCH) to determine if the UE is being paged.

At step 206, after determining that it is about to enter a UE induced measurement gap period, the UE executes a mitigation algorithm in order to prevent the data server from timing out the data transmission. Whether the data transmission is an uplink data transmission or a downlink data transmission, the UE-executed mitigation algorithm induces desirable legacy network behavior that reduces the likelihood that a server timeout will occur on the network. In one embodiment, this is accomplished by conveying information from the UE to one or more entities on the network (e.g. an eNB or TCP server) that forces these entities to take remediation steps in response to this conveyed information. For example, the UE will convey information to one or more network entities that is indicative of problems with the communications link, even though the communications link remains unaltered. In response, these network entities will adjust their behavior in such a fashion that results in a reduced likelihood of the data server timing out its data transmission.

Alternatively, the UE will convey information to one or more entities on the network that cause these entities to busy themselves during the UE induced measurement gap period. For example, the UE can trigger a retransmission of data from the one or more network entities. Specific examples of mitigation algorithm implementations are now described in detail.

In some embodiments, the UE may wait a determined time interval before initiating the mitigation algorithm. In one variant, the time interval is a fixed time. In other variants, the time interval is a dynamically determined time interval. For example, in one such variant, the time interval may be based on previous tune away periods. During each tune away period instance, the UE determines the length of the tune away. Subsequent time intervals can be determined based on the statistical behavior of historical tune away periods. In one case, the UE can perform an autocorrelation of the historical tune away period length to find a statistically useful time interval (e.g., the median time interval, the mean time interval, etc.).

Example Operation #1

Figure 3:
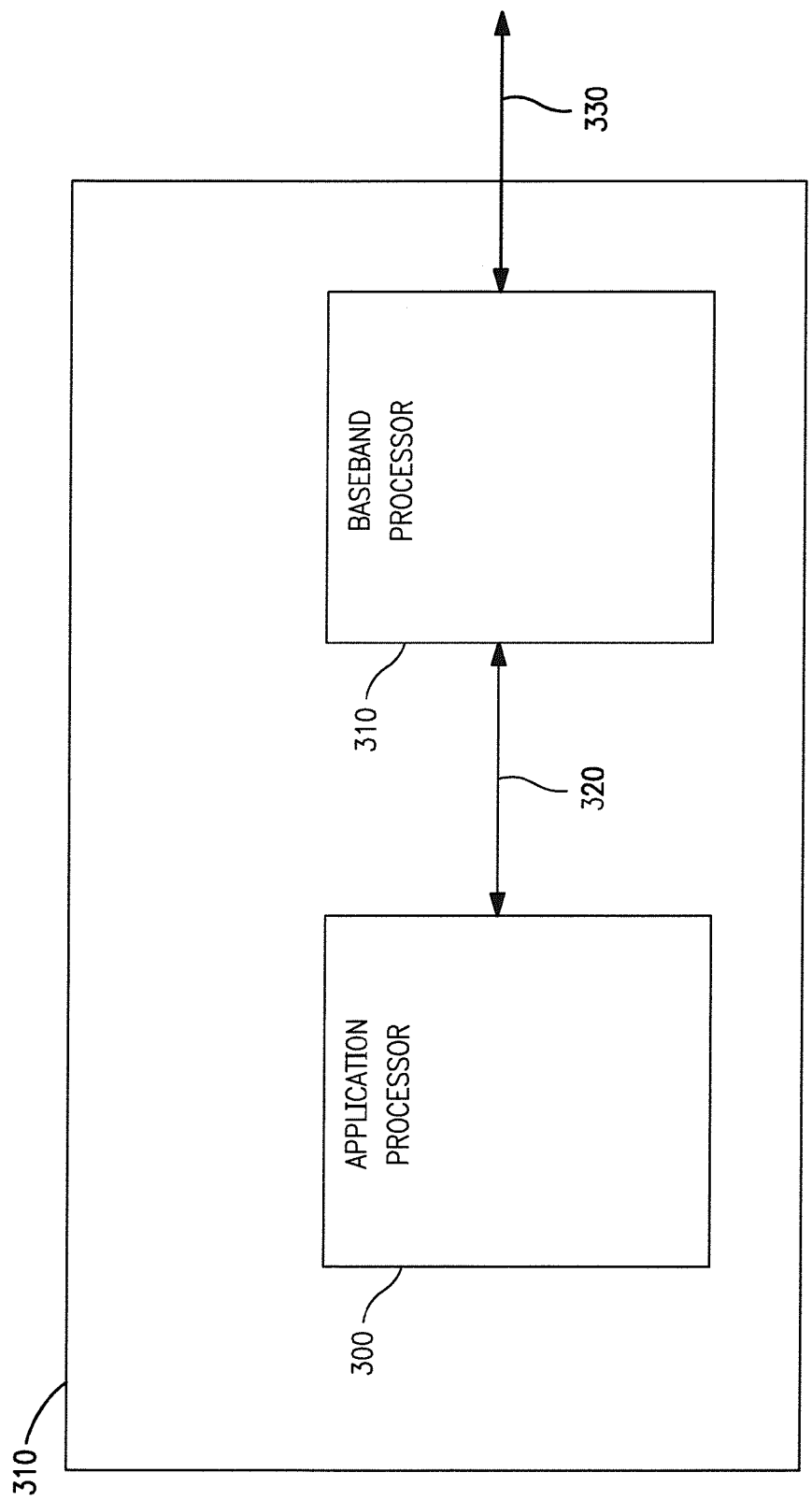
FIG. 3 is a logical flow diagram detailing one exemplary implementation of a method of mitigating data transmission time-outs according to the present invention.

Referring now to FIG. 3, example operation of an exemplary UE 310 for mitigating TCP level back-offs is shown and described in detail. The UE typically includes an application processor 300 coupled via a data bus 320 to a baseband processor 310. The baseband processor in turn communicates with an LTE RAN via network interface 330. During LTE mode operation, the UE is aware of the timing of UE-induced measurement gaps, in which the UE needs to tune away from the LTE network to perform CDMA 1X maintenance actions. More specifically, the UE baseband processor 310 will have to communicate with the UE application processor 300 in order to inform the application processor that the UE is about to enter into a measurement gap period.

Figure 4:
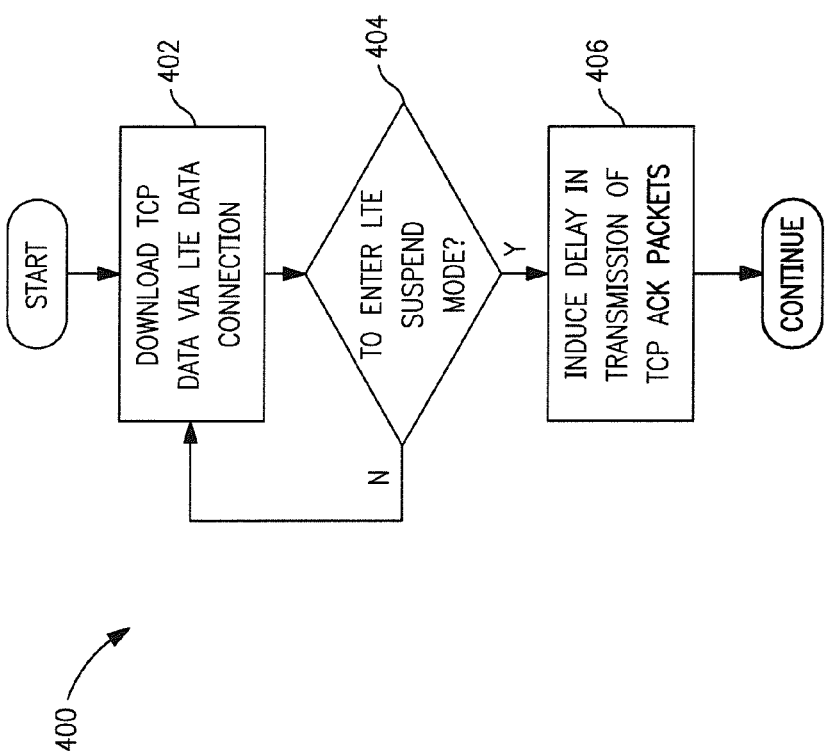
FIG. 4 is a logical flow diagram detailing a first exemplary implementation of a method of mitigating downlink data transmission time-outs according to the present invention.

Referring now to FIG. 4, first exemplary methodology 400 for mitigating TCP level back-offs during downlink data transmissions is shown and described in detail. At step 402, the UE will download TCP data via an LTE data connection. In one embodiment, the TCP data constitutes multimedia content. At step 404, the UE determines whether it is about to enter into an LTE suspend mode in order to perform, for example, maintenance actions on a non-LTE network to which the UE is also connected. If the UE determines that it is not about to enter into an LTE suspend mode, the download of TCP data continues.

Alternatively, at step 406, the UE will execute a server time-out mitigation algorithm. Prior to entering this UE induced measurement gap period (i.e. LTE suspend mode), the UE application processor will induce some delay in the TCP ACKs sent back towards the network in response to received data packets. The TCP server upon receiving these delayed TCP ACKs will respond by reducing its data rate due to extant flow-control processes resident on the TCP server, as the TCP server will assume that the resultant TCP ACK delay is a result of a degraded communications link. This delay in the ACKs transmitted towards the TCP server is in one embodiment implemented in an incremental fashion, in order not to result in a TCP Retransmission Time Out (RTO) due to the induced delay of ACK responses.

As a brief aside, the RTO parameter is calculated as a function of the mean Round Trip Time (RTT), as well as any RTT variances seen by the TCP server. This relationship can be expressed as: RTO=Fn(mean RTT, variance RTT). Accordingly, the induced delay and resultant increased RTT and variance will result in the TCP server adjusting (i.e. increasing) its RTO value. This increased RTO in turn reduces the probability of encountering a TCP RTO during UE induced measurement gap periods, thereby improving the perceived throughput of data by the user of the UE.

Example Operation #2

Figure 5:
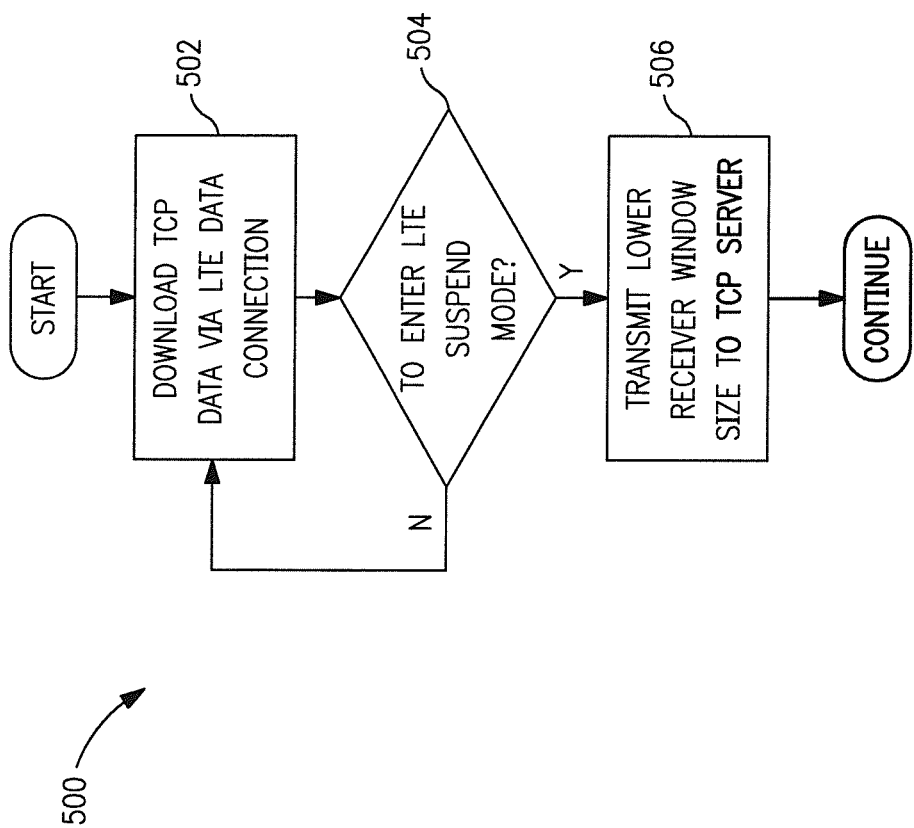
FIG. 5 is a logical flow diagram detailing a second exemplary implementation of a method of mitigating downlink data transmission time-outs according to the present invention.

Referring now to FIG. 5, alternative exemplary methodology 500 for mitigating TCP level back-offs during downlink data transmissions is shown and described in detail. At step 502, the UE will download TCP data via an LTE data connection. At step 504, the UE determines whether it about to enter into an LTE suspend mode in order to perform, for example, maintenance actions on a non-LTE network to which the UE is also connected. If the UE determines that it is not about to enter into an LTE suspend mode, the download of TCP data continues.

Alternatively, at step 506, the UE will execute a server time-out mitigation algorithm. More specifically, the UE application processor 200 will trigger extant flow control processes in the TCP server through the manipulation of the negotiated receiver window size. The TCP receiver window size is the amount of data that the UE can accept from the TCP server without acknowledging the receipt of data via the transmission of an ACK packet. Accordingly, the TCP server will limit the amount of data transmitted if it has not received acknowledgement from the UE after the transmission of data packets up to the defined receiver window size. Prior to entering UE-induced measurement gap periods, the baseband processor 210 will inform the application processor 200 of the impending tune out period. In response, the application processor will inform the TCP server of a lower receiver window size. By lowering the receiver window size for the transmission of data between the TCP server and UE, and the TCP server will alter its behavior in the belief that the communications link with the UE is degrading. Extant flow control processes at the TCP server will also be executed, which reduce the probability of encountering a TCP RTO during these UE induced measurement gaps. This also will reduce the likelihood of packet loss during data transmission.

Example Operation #3

In yet another variant, an induced delay in TCP ACK transmission from the UE, in combination with the lowering of receiver window size prior to entering a UE induced measurement gap period, is implemented in order to reduce the probability of encountering a TCP RTO during these UE induced measurement gap periods.

Example Operation #4

Figure 6:
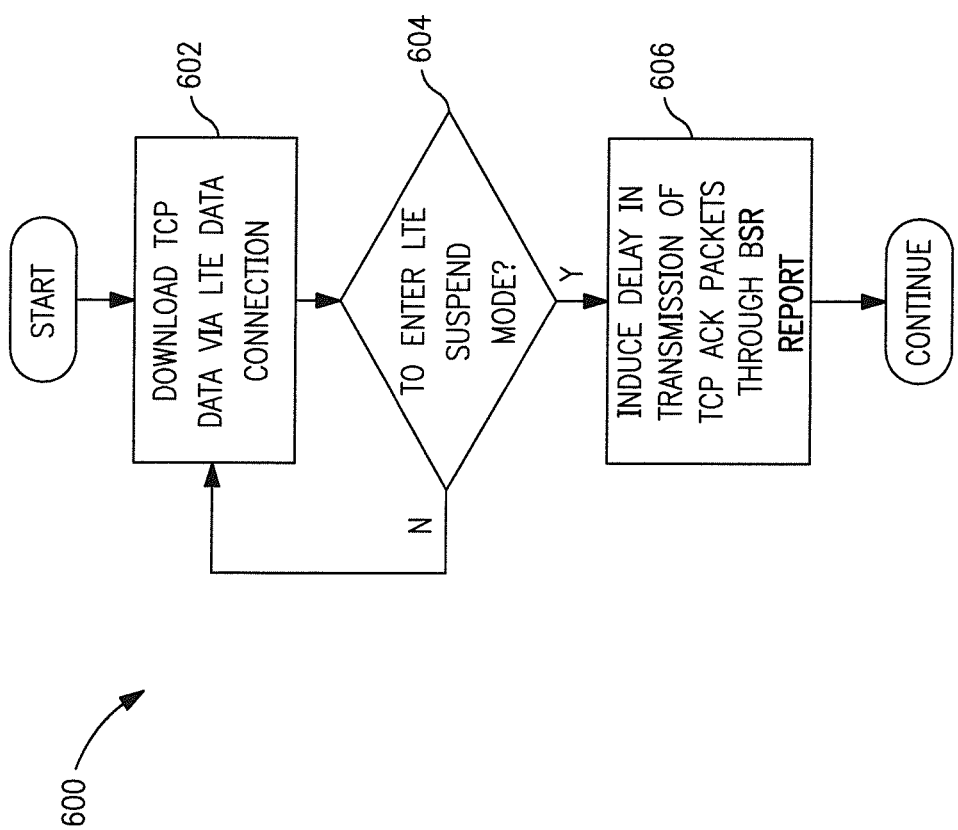
FIG. 6 is a logical flow diagram detailing a third exemplary implementation of a method of mitigating downlink data transmission time-outs according to the present invention.

Referring now to FIG. 6, yet another alternative methodology 600 for mitigating TCP level back-offs during downlink data transmissions is shown and described in detail. At step 602 of the method 600, the UE will download TCP data via an LTE data connection. At step 604, the UE determines whether it about to enter into an LTE suspend mode. If the UE determines that it is not about to enter into an LTE suspend mode, the download of TCP data continues.

Alternatively, at step 606 the UE will execute a server time-out mitigation algorithm. At step 606 TCP level back-offs are mitigated through processes executed by the baseband processor 210 without necessitating the involvement of the application processor of the UE. More specifically, and in one embodiment, the baseband processor will induce a delay in the transmission of TCP ACK packets from the UE to the TCP server without involving the TCP client. The UE will convey to the eNB (e.g., via network interface 230) a manipulated Buffer Status Report (BSR) which is traditionally used to inform the eNB how much data is pending in the UE buffer. Accordingly, prior to entering the UE induced measurement gap period, the UE will progressively reduce the allocations from the eNB through the BSR so that the eNB reduces the grants (and thereby implicitly induces a delay in the TCP ACKs transmitted to the TCP server). Flow control processes at the TCP server will also be executed, which reduce the probability of encountering a TCP RTO during these UE induced measurement gaps, which in turn reduce the likelihood of packet loss during data transmission.

Example Operation #5

Figure 7:
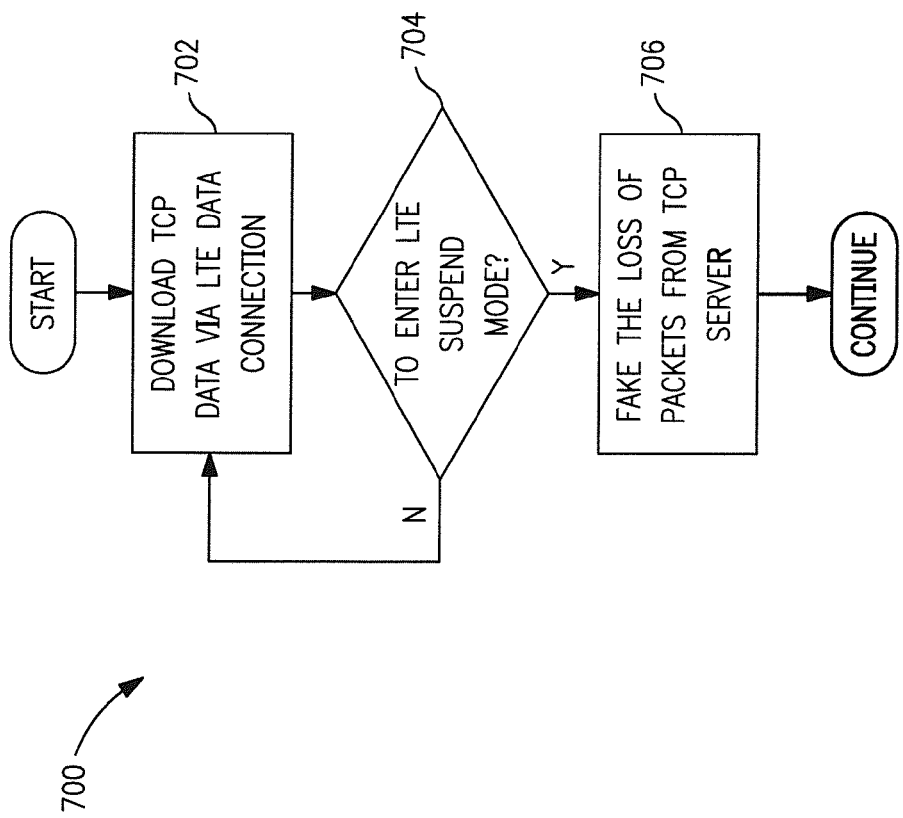
FIG. 7 is a logical flow diagram detailing a fourth exemplary implementation of a method of mitigating downlink data transmission time-outs according to the present invention.

Referring now to FIG. 7, yet another alternative methodology 700 for mitigating TCP level back-offs during downlink data transmissions is shown and described in detail. At step 702 of the method 700, the UE will download TCP data via an LTE data connection. At step 704, the UE determines whether it about to enter into an LTE suspend mode. If the UE determines that it is not about to enter into an LTE suspend mode, the download of TCP data continues.

Alternatively, at step 706 the UE will execute a server time-out mitigation algorithm. At step 706, a Radio Link Control (RLC) entity resident on the UE will report the loss of packets to the eNB transmitter through an RLC status report. Accordingly, even though the UE will have properly received the transmission, the reported loss of packets prior to the UE entering the measurement gap period will cause the eNB to retransmit the "lost" packets. As the retransmitted Protocol Data Unit (PDU) will be lost anyways as the UE tunes away from the LTE network to perform CDMA 1X maintenance actions, this manipulation of eNB behavior averts the loss of new PDUs, and reduces the overall PDU loss rate. This ultimately results in lower packet loss rate to the TCP. In other words, the UE essentially occupies the eNB with packet retransmission tasks during these tune away periods. Accordingly, because the eNB will now busy itself with packet retransmission actions, the likelihood that TCP server time-outs during data transmission will occur is substantially reduced. This approach does create increased packet transmission on the network by virtue of causing unnecessary retransmissions; however, this is more than counterbalanced by the additional overhead, signaling, and packet transmissions encountered in recovering from a server time-out event.

Example Operation #6

Figure 8:
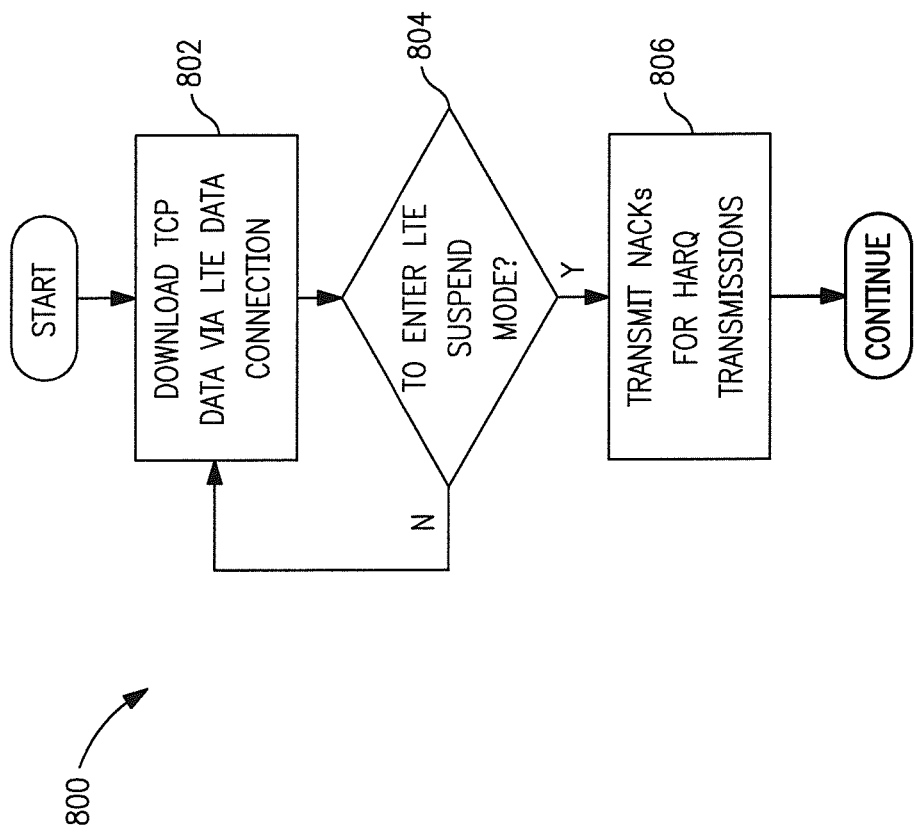
FIG. 8 is a logical flow diagram detailing a fifth exemplary implementation of a method of mitigating downlink data transmission time-outs according to the present invention.

Referring now to FIG. 8, yet another alternative methodology 800 for mitigating TCP level back-offs during downlink data transmissions is shown and described in detail. At step 802 of the method 800, the UE will download TCP data via an LTE data connection. At step 804, the UE determines whether it about to enter into an LTE suspend mode. If the UE determines that it is not about to enter into an LTE suspend mode, the download of TCP data continues.

Alternatively, at step 806, the UE will execute a server time-out mitigation algorithm. More specifically, at step 806 the UE, prior to entering LTE suspend mode (i.e., prior to tuning away from the LTE network) will transmit negative acknowledgement packets (NACKs) for Hybrid Automatic Repeat Request (HARQ) transmissions even though the previously transmitted data was actually received by the UE properly. Accordingly, and similar to the example operation discussed previously above, the network will busy itself with retransmissions during the tune-away period of the UE thereby avoiding the loss of original transmissions. By preoccupying the network with packet retransmission, the likelihood that TCP server time-outs during data transmission will occur is thereby significantly reduced.

Example Operation #7

Figure 9:
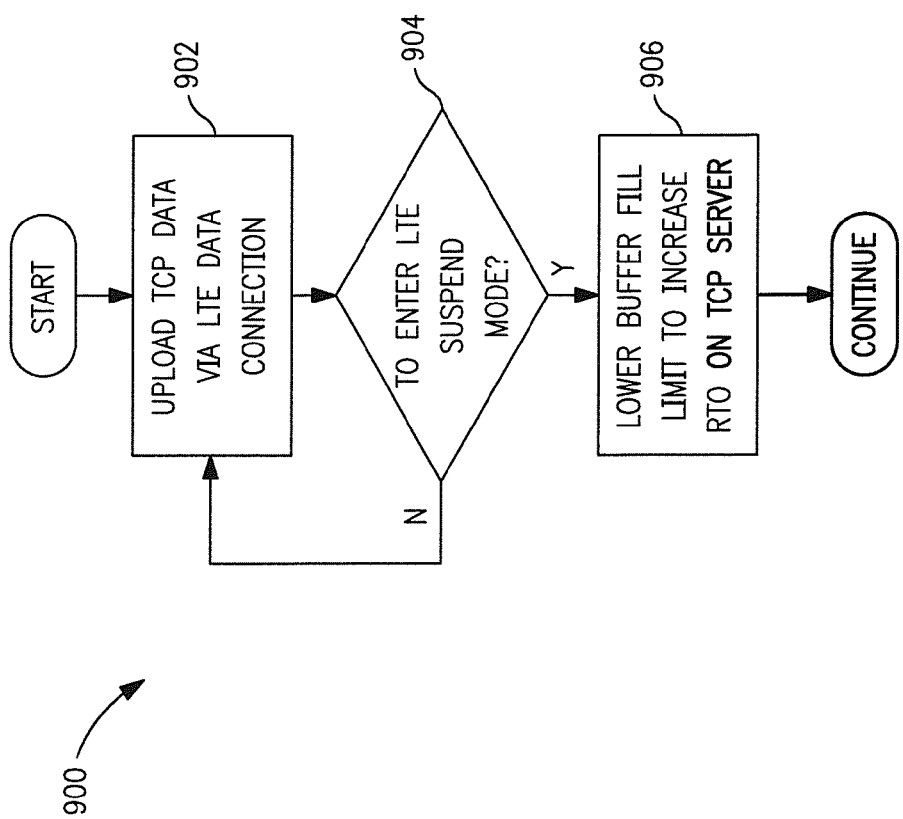
FIG. 9 is a logical flow diagram detailing a first exemplary implementation of a method of mitigating uplink data transmission time-outs according to the present invention.

Referring now to FIG. 9, first exemplary methodology 900 for mitigating TCP level back-offs during uplink data transmissions is shown and described in detail. At step 902 of the method 900, the UE will upload TCP data via an LTE data connection. At step 904, the UE determines whether it is about to enter into an LTE suspend mode. If the UE determines that it is not about to enter into an LTE suspend mode, the upload of TCP data continues.

Alternatively, at step 906 the UE will execute a server time-out mitigation algorithm. Typically, all buffers (e.g. RLC/MAC, PDCP, etc.) have a flow control mechanism determined by "low" and "high" watermark levels. When the "high watermark" level is hit, the layer above in the stack will not be able to write data into the buffer. For uplink traffic, RLC/MAC buffers can restrict the incoming data rates by adjusting (i.e., lowering) high watermark thresholds so that the higher layers (e.g. PDCP and TCP) alter their rates in which data is being written. This method artificially increases the mean RTT, thereby causing the RTO to increase on the TCP side. Accordingly, prior to entering LTE suspend mode, the UE will at step 906 lower the buffer fill limit in order to increase the RTO value on the TCP server. By increasing the RTO on the TCP server, the likelihood that TCP server time-outs during data transmission will occur is significantly reduced. This buffer fill limit may be lowered in one step, or alternatively in a more progressive fashion (e.g., multiple increasing steps) so as to avoid significant transients on the network which may also trigger a time-out event.

Example Operation #8

Figure 10:
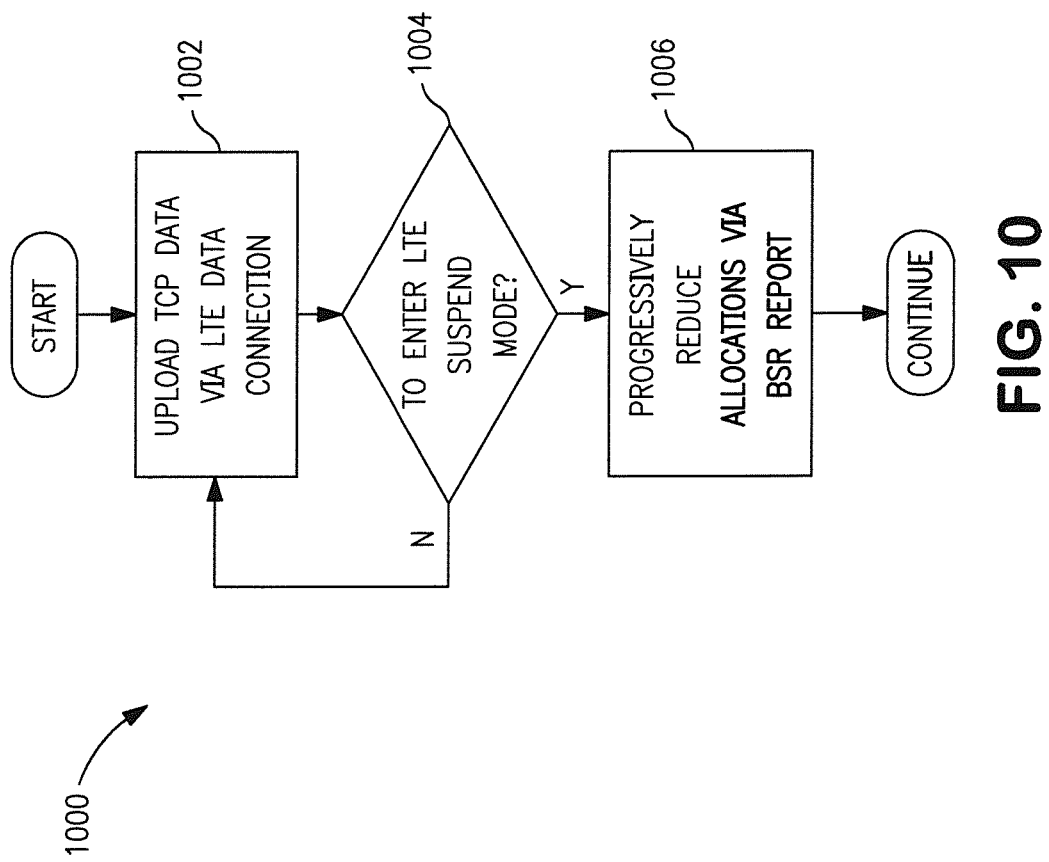
FIG. 10 is a logical flow diagram detailing a second exemplary implementation of a method of mitigating uplink data transmission time-outs according to the present invention.

Referring now to FIG. 10, another alternative methodology 1000 for mitigating TCP level back-offs during uplink data transmissions is shown and described in detail. At step 1002 of the method 1000, the UE will upload TCP data via an LTE data connection. At step 1004, the UE determines whether it is about to enter into an LTE suspend mode. If the UE determines that it is not about to enter into an LTE suspend mode, the upload of TCP data continues.

Alternatively, and just prior to UE tune-away from the LTE data connection, at step 1006 the UE will progressively reduce its allocations requested to the eNB. The UE accomplishes this by reducing the allocations requested in the BSR transmitted to the eNB. Accordingly, by reducing the allocations requested to the eNB, the probability of lost ACK packets coming from the receiver end is reduced thereby avoiding re-transmissions from the TCP side of the network. Accordingly, the likelihood that TCP server time-outs will occur during uplink data transmission is significantly reduced.

Example Operation #9

Figure 11:
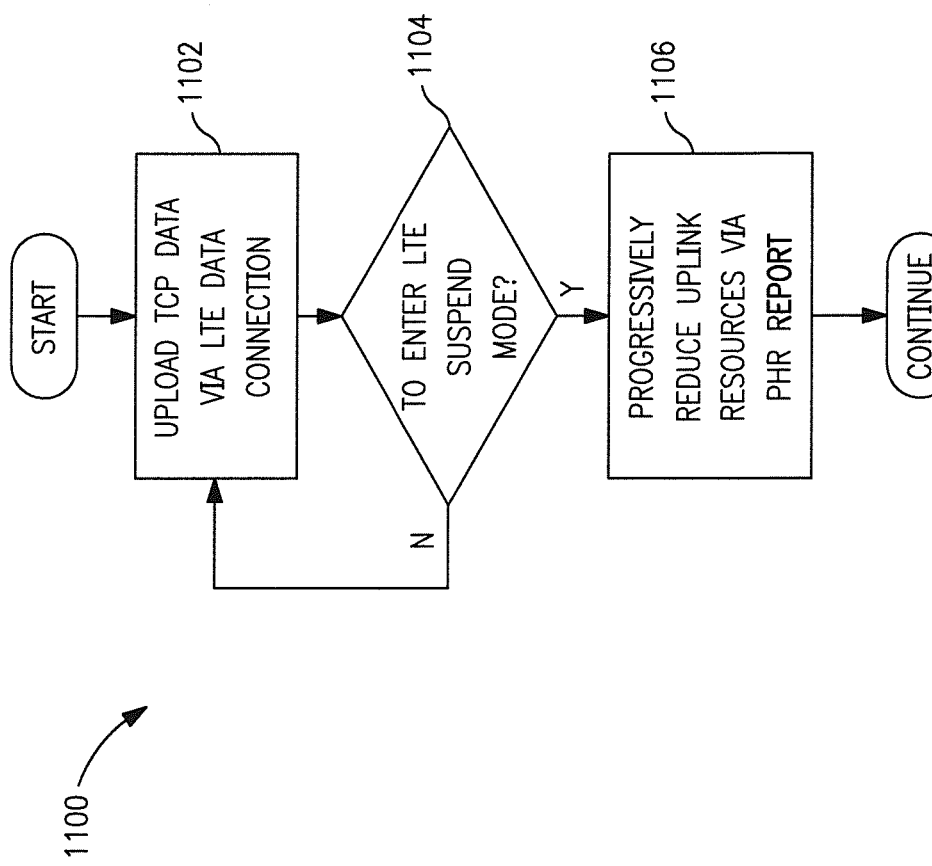
FIG. 11 is a logical flow diagram detailing a third exemplary implementation of a method of mitigating uplink data transmission time-outs according to the present invention.

Referring now to FIG. 11, still another alternative methodology 1100 for mitigating TCP level back-offs during uplink data transmissions is shown and described in detail. At step 1102 of the method 1100, the UE will upload TCP data via an LTE data connection. At step 1104, the UE determines whether it is about to enter into an LTE suspend mode. If the UE determines that it is not about to enter into an LTE suspend mode, the upload of TCP data continues.

Alternatively, and just prior to UE tune-away from the LTE data connection, at step 1106 the UE will progressively reduce its uplink resource allocations as transmitted to the eNB. It accomplishes this via the communication of a Power Headroom Report (PHR) that communicates to the eNB the additional return power available at the UE. Accordingly, by reducing the uplink resources requested to the eNB, the probability of lost ACK packets coming from the receiver end is reduced thereby avoiding re-transmissions from the TCP side of the network. Accordingly, the likelihood that TCP server time-outs during data transmission will occur is significantly reduced.

Network Based Variants—

The foregoing exemplary methods are all directed primarily at UE-instigated behavior; e.g., when the UE is about to enter a tune-away period from LTE, it invokes some mitigation action(s). In alternate implementations, a network entity (such as the TCP server or designated proxy) is aware of the hybrid configuration/status of the UE, such as by way of a priori knowledge of the UE's configuration (e.g., a database which the server can access to determine if the UE is capable of hybrid operation), or by way of an uplink communication from the UE indicating that it is about to enter "hybrid" operation (e.g., tune-away from LTE in favor of an incipient CDMA voice call), and the server or entity can then apply modified timeout rules for that UE. For example, in one implementation, the UE signals the TCP server or its proxy as to the impending tune-away (which may include delaying the tune-away onset momentarily until the TCP server acknowledges), thereby giving the TCP server time to modify its behavior before tune-away by the UE. Such modification may include for example invoking any of the aforementioned procedures (e.g., reduced window size, remediation on the network, retransmission, etc.) so as to reduce the likelihood of a timeout event. It will be appreciated that while this embodiment requires implementation/modification to the extant network infrastructure, it also advantageously alleviates the UE from having the indigenous logic necessary to support issuing the remedial or corrective (mitigation) algorithms itself, since the network (e.g., TCP server or proxy) will decide when and how to implement such mitigation measures. This allows the UE to be "thinner" and less complex, and also ostensibly consumes less electrical power on the UE, since the UE merely need only format and transmit an uplink "tune-away impending" message or other comparable signaling.

Apparatus—

Figure 12:
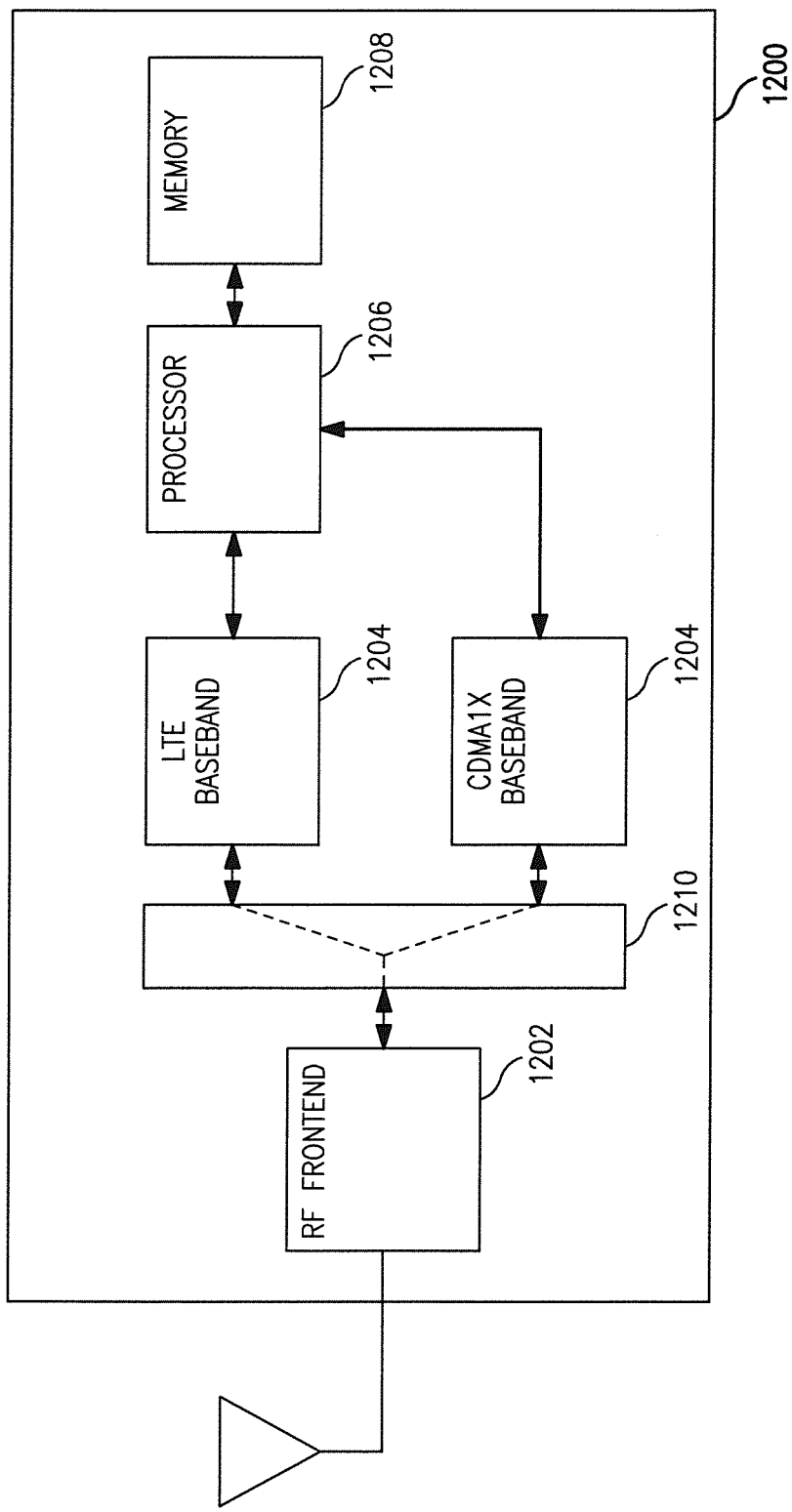
FIG. 12 is a functional block diagram of an exemplary embodiment of a user equipment (UE) apparatus configured according to the present invention.

Referring now to FIG. 12, the exemplary user equipment (UE) apparatus 1200 is illustrated in greater detail. The UE includes: (i) one or more Radio Frequency (RF) front-ends 1202, (ii) one or more baseband processors 1204, and (iii) at least one application processor 1206 and associated memor(ies) 1208. In various implementations, the RF front-ends and baseband processors may be further specialized to handle a single wireless technology, or generalized to encompass multiple wireless technologies.

As shown, the exemplary UE includes a first RF front-end that is coupled to both first and second baseband processors adapted to interface to a LTE network and CDMA 1X network, respectively. It is further appreciated that the foregoing configuration is purely illustrative, and various implementations may include other cellular technologies such as GSM, GPRS, EDGE, WCDMA, CDMA2000, CDMA 1X EVDO, LTE-A (LTE Advanced), etc. in various combinations. Moreover, while only a single RF front-end is shown for simplicity, it is appreciated that a RF front-end can (and generally will) include multiple receive and/or transmit antennas and/or chains. For example, well known MIMO (Multiple In Multiple Out), SISO (Single In Single Out), MISO (Multiple In Single Out), and SIMO (Single In Multiple Out) antenna configurations are widely used within the related arts, and may be used consistent with the present invention.

Additionally, in one exemplary embodiment of the present invention, the UE 1200 further comprises a switching fabric 1210 that can connect any one (or more) of the baseband processors 1204 to various one (or more) of the antennas 1202. The illustrated switching fabric is adapted to connect either the LTE baseband or CDMA 1X baseband to the RF front-end. However, common embodiments may connect one baseband processor to one antenna ("one-to-one"), one-tomany, many-to-one, etc. This "switching" capability is desirable for a number of reasons, including for example: (i) power management, (ii) processing efficiency/flexibility, and (iii) antenna isolation constraints may require that only a subset of radios of a mobile device are active at any one time. In some small form factor designs, there is not enough space to completely isolate multiple antennas during operation; consequently, only one antenna can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, etc.)

Moreover, it will be appreciated that other components are commonly incorporated within UE 1200, but are not discussed further herein. For example, the UE may include user interface components (display screens, buttons, touch screens, dials, etc.), memory components (e.g., RAM (Random Access Memory), Flash, hard disk drives (HDD), etc.), power management components (e.g., batteries, charger components, etc.), and external interfaces (e.g., FireWire™, Universal Serial Bus™ (USB), Thunderbolt, etc.)

Still other variants useful with the present invention are described with greater detail in co-owned and co-pending U.S. Provisional Patent Application Ser. No. 61/478,922 filed Apr. 25, 2011, and entitled "DUAL NETWORK MOBILE DEVICE RADIO RESOURCE MANAGEMENT," U.S. patent application Ser. No. 13/099,204, filed May 21, 2011, and entitled "SINGLE-RADIO DEVICE SUPPORTING COEXISTENCE BETWEEN MULTIPLE RADIO ACCESS TECHNOLOGIES," U.S. Provisional Patent Application Ser. Nos. 61/472,617 filed Apr. 6, 2011, and entitled "MULTIPLE NETWORK MOBILE DEVICE CONNECTION MANAGEMENT," 61/433,160 filed Jan. 14, 2011, and entitled "DYNAMIC LOADING IN DEVICES WITH MULTIPLE ANTENNAS," and 61/433,162 filed Jan. 14, 2011, and entitled "MULTIMODE USER EQUIPMENT WITH DUAL CIRCUIT ARCHITECTURE," each of the foregoing being incorporated herein by reference in its entirety.

The baseband processors 1204 and application processor 1206 are connected to one or more memory resources 1208, where the data server time-out mitigation algorithms are stored in memory. In one exemplary embodiment, these data server time-out mitigation algorithms comprise one or more computer program(s) which obtain information regarding tune away periods from the baseband processors and execute an appropriate data server time-out mitigation algorithm. Other approaches may be used as well, such as combinations of software and logic, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A mobile wireless apparatus, comprising:
one or more processors;
at least one air interface configurable to communicate via a first wireless network or a second wireless network; and
a non-transitory computer-readable medium storing executable instructions, that when executed by the one or more processors, causes the mobile wireless apparatus to:
determine when to tune away the at least one air interface from the first wireless network to the second wireless network; and
prior to tuning away the at least one air interface, implement a function that reduces a likelihood that a network server will adversely alter an operation of the network server when transferring data to the mobile wireless apparatus using a transport protocol,
wherein the adverse alteration of the operation of the network server is associated with the network server timing out within the transport protocol based at least in part on the network server not receiving one or more acknowledgements from the mobile wireless apparatus.

2. The mobile wireless apparatus of claim 1, wherein the first wireless network is a long term evolution (LTE) compliant network, and the second wireless network is a code division multiple access (CDMA) compliant network.

3. The mobile wireless apparatus of claim 1, wherein the tune away from the first wireless network to the second wireless network is performed in order to maintain communication continuity for the mobile wireless apparatus.

4. The mobile wireless apparatus of claim 1, wherein the timing out of the network server causes an undesirable latency in transferring the data to the mobile wireless apparatus.

5. The mobile wireless apparatus of claim 1, wherein the function comprises imposing a delay in sending acknowledgement messages from the mobile wireless apparatus to the network server during the transmission of the data.

6. The mobile wireless apparatus of claim 1, wherein the function comprises reducing a fill limit associated with at least one data buffer maintained by the mobile wireless apparatus.

7. The mobile wireless apparatus of claim 1, wherein the function comprises reducing an uplink resource allocation of the mobile wireless apparatus for communicating via the first wireless network.

8. The mobile wireless apparatus of claim 7, wherein the uplink resource allocation of the mobile wireless apparatus for communicating via the first wireless network is transmitted using at least one of:
(i) a buffer status report (BSR); and
(ii) a power headroom report (PHR).

9. A method for reducing a likelihood of a network server time-out during a data transfer to a mobile device from the network server, the method comprising:
at the mobile device:
employing at least one air interface;
determining when to tune away the at least one air interface from a first wireless network to a second wireless network; and
prior to tuning away the at least one air interface, executing a mitigation algorithm to reduce a likelihood of the network server experiencing a transfer protocol time-out during the data transfer based at least in part on the network server not receiving one or more acknowledgement messages from the mobile device.

10. The method of claim 9, wherein the at least one air interface is associated with a high-speed wireless cellular data access technology that is optimized for transferring large amounts of Internet Protocol (IP)-based data.

11. The method of claim 9, wherein the tune away of the at least one air interface from the first wireless network to the second wireless network allows the mobile device to maintain communication continuity.

12. The method of claim 9, wherein the first wireless network is a long term evolution (LTE) compliant network, and the second wireless network is a code division multiple access (CDMA) compliant network.

13. A mobile wireless apparatus, comprising:
one or more processors;
at least one air interface configurable to communicate via a first wireless network or a second wireless network; and
a non-transitory computer-readable medium storing executable instructions, that when executed by the one or more processors, causes the mobile wireless apparatus to:
determine when to tune away the at least one air interface from the first wireless network to the second wireless network for a period of time; and
transmit a message or a signal to a network server to cause the network server to transfer data associated with previously transferred data to the mobile wireless apparatus to cause the network server to implement a function that reduces a likelihood that the network server will adversely alter an operation of the network server associated with a data transmission to the mobile wireless apparatus during the tune away,
wherein the mobile wireless apparatus transmits the message or the signal to the network server after the tune away commences and before an acknowledgement message associated with the data transmission is sent from the mobile wireless apparatus to the network server.

14. The mobile wireless apparatus of claim 13, wherein the message or signal is transmitted before the tune away of the at least one air interface from the first wireless network to the second wireless network concludes.

15. The mobile wireless apparatus of claim 13, wherein the function implemented by the network server comprises the network server imposing a delay on invoking a timeout condition resulting from the network server not receiving one or more acknowledgement messages from the mobile wireless apparatus.

16. The mobile wireless apparatus of claim 13, wherein the function implemented by the network server comprises the network server adjusting the transmission of data to the mobile wireless apparatus for at least a period of time, such that acknowledgement messages from the mobile wireless apparatus are required less frequently.

* * * * *